United States Patent [19]

Kervagoret

[11] Patent Number: 4,706,460
[45] Date of Patent: Nov. 17, 1987

[54] HYDRAULIC BRAKE VALVE CAPABLE OF OPERATING AS CONVENTIONAL MASTER CYLINDER WHEN BRAKE PRESSURE SOURCE FAILS

[75] Inventor: Gilbert Kervagoret, Argenteuil, France

[73] Assignee: Bendix France, Paris, France

[21] Appl. No.: 827,130

[22] Filed: Feb. 6, 1986

[30] Foreign Application Priority Data

Feb. 20, 1985 [FR] France .................. 85 02460

[51] Int. Cl.$^4$ .................. B60T 17/18; B60T 11/32
[52] U.S. Cl. ......................... 60/565; 60/582; 91/6
[58] Field of Search .................. 60/555, 556, 557, 558, 60/559, 565, 566, 560, 563, 582; 91/460, 6, 280

[56] References Cited

U.S. PATENT DOCUMENTS

| | | | |
|---|---|---|---|
| 3,789,611 | 2/1974 | Marquardt | 60/566 |
| 4,312,182 | 1/1982 | Filderman | 60/556 X |
| 4,449,369 | 5/1984 | Dauvergne | 60/556 |

FOREIGN PATENT DOCUMENTS

| | | | |
|---|---|---|---|
| 2608979 | 9/1977 | Fed. Rep. of Germany . | |
| 2757757 | 7/1978 | Fed. Rep. of Germany | 60/582 |
| 61152 | 3/1955 | France . | |
| 2051589 | 4/1971 | France . | |
| 2554875 | 5/1985 | France . | |
| 2570663 | 3/1986 | France . | |

Primary Examiner—Robert E. Garrett
Assistant Examiner—George Kapsalas
Attorney, Agent, or Firm—Larry J. Palguta; Ken C. Decker

[57] ABSTRACT

Hydraulic assistance device, incorporating a casing (10) provided with a bore (12) in which first piston means (16, 18) is slideably mounted, the piston (16, 18) being able to move under the effect of the actuation of a brake pedal between a first position allowing communication between a first chamber (72) which is connected to a braking circuit (70) and a low pressure reservoir (40), and isolating this chamber (72) from a source of high pressure fluid (76), and a second position isolating the chamber (72) from the low pressure reservoir (40) and causing it to communicate with the high pressure source (76), the device also incorporating a second chamber (38) formed in the casing (10), the communication between the first chamber (72) and the reservoir (40) incorporating a second bore (52) in which a control piston (54) of second piston means (54, 60) is slideably mounted, incorporating a bore (56), the first piston having a bore in which a plunger (31) is slideably mounted, the plunger (31) joining the first piston means to the second piston means (54, 60), and a valve (62) which is capable of closing the communication between the first chamber (72) and the reservoir (40) under the effect of the movement of the first piston, characterized in that the first chamber (72) is isolated from the second chamber (38) by a seal (86) which is slideably mounted in the bore (12) and is capable of being moved by the first piston means (16, 18) when the hydraulic pressures in the first and second chambers are essentially equal.

4 Claims, 2 Drawing Figures

HYDRAULIC BRAKE VALVE CAPABLE OF OPERATING AS CONVENTIONAL MASTER CYLINDER WHEN BRAKE PRESSURE SOURCE FAILS

BACKGROUND OF THE INVENTION

1. Field of the Invention

The present invention concerns hydraulic assistance devices and more particularly such a device for a braking circuit with mixed hydrodynamic (more commonly known by the description "full power") and hydrostatic operation.

2. Description of the Prior Art

A hydraulic assistance device of the "full power" type is known from French Patent Publication No. 2,570,663 of Gilbert Kervagoret, the device being capable of operating as a conventional master cylinder, in the hydrostatic mode, in the case of failure of the high pressure circuit. The device incorporates an annular cup which separates a first master cylinder pressure chamber from a second pressure chamber which is connected to the brakes of the vehicle and is capable of being connected selectively to the high pressure source. In the case of failure of the high pressure circuit, when the device is operated, a piston which defines the first chamber moves and compresses the fluid in the first chamber, which causes tilting of the cup and allows the fluid under pressure to pass in the hydrostatic mode towards the brakes.

Despite its obvious advantages, this system nevertheless has slight disadvantages in that the thresholds of force may become too high and that the distribution leakage may also be considered as excessive.

SUMMARY OF THE INVENTION

The aim of the invention is therefore to propose a hydraulic assistance device of the "full power" type which is capable of operating as a conventional master cylinder in the case of failure of the high pressure circuit, having reduced thresholds of force and limited distribution leakage.

To achieve this, the invention concerns a hydraulic assistance device, comprising a casing provided with a bore in which a first piston means is slideably mounted, the first piston means being capable of moving under the effect of the actuation of a brake pedal between a first position allowing communication between a first chamber connected to a braking circuit and a low pressure reservoir, and isolating this chamber from a source of high pressure fluid, and a second position isolating the chamber from the low pressure reservoir and causing the chamber to communicate with the high pressure source, the device also incorporating a second chamber formed in the casing, the means of communication between the first chamber and the reservoir incorporating a second bore in which second piston means is slideably mounted, the second piston means including a bore, the first piston means having a bore in which a plunger is slideably mounted and which joins the first piston means to the second piston, and valve means which is capable of closing the means of communication between the first chamber and the reservoir under the effect of the movement of the first piston means, characterized in that the first chamber is isolated from the second chamber by a seal which is slideably mounted in the bore of the casing and which is capable of being moved by the piston means when the hydraulic pressures in the first and second chambers are essentially equal.

Other characteristics and advantages of the present invention will emerge from the following description of an embodiment which is given by way of illustration, but which is not limiting in any way, with reference to the accompanying drawings, in which:

DESCRIPTION OF THE PREFERRED EMBODIMENT

Figure 1:
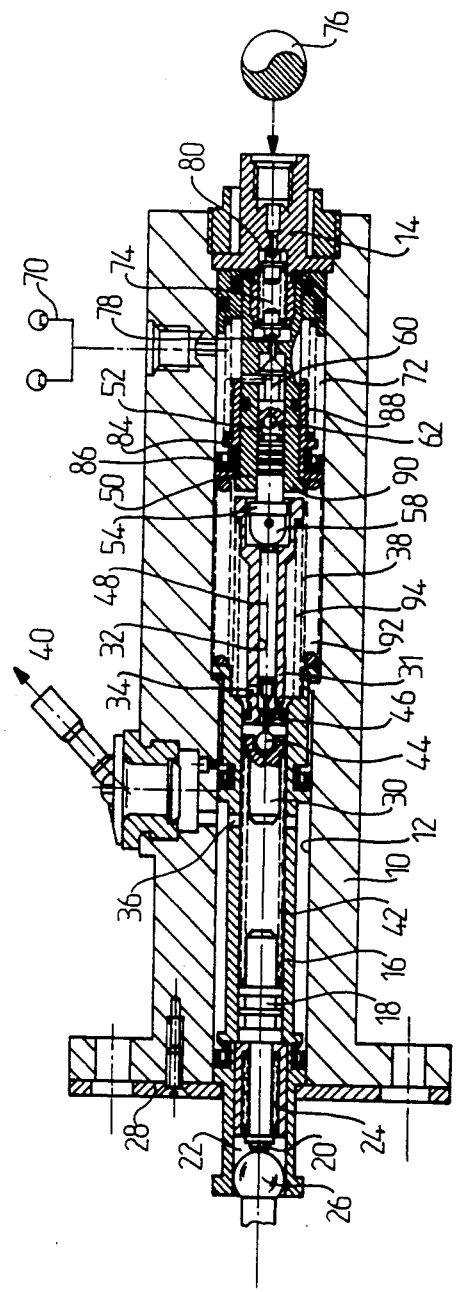
FIG. 1 is a longitudinal sectional view of a hydraulic assistance device according to the invention.

As shown in FIG. 1, the hydraulic assistance device, which in the example shown is a master cylinder, comprises a casing 10 comprising a stepped main bore 12 which is closed at one end by a closure component 14. A first piston means 16 is slideably mounted in the bore 12, the first piston means 16 being in the form of a sleeve 16 in which an inner piston 18 is slideably mounted. The inner piston 18 incorporates a pushrod 20 which lies in a housing 22 of the sleeve 16 and is joined to the sleeve by a spring 24. When the device is operated, the shape of the housing 22 allows an initial movement of the second piston 18 before the head of a plunger 26, which is connected to the brake pedal (not shown), comes to bear against the sleeve 16.

The first piston means 16 is held in abutment to the rear by a plate 28 attached to the casing 10. Also slideably mounted in the first piston means 16 are a thrust component 30 and a plunger 31 in which a longitudinal stepped passage 32 and a lateral opening 34 are formed, which form together with a hole 36 in the first piston means 16 a passage between a pressure chamber 38 and a low pressure reservoir 40 (not shown). The thrust component 30 is joined to the inner piston 18 by a spring 42. The thrust component 30 incorporates a ball 44 which is capable of closing a seat 46 at the end of the plunger 31 but is held, in the rest position of the device, in its open position by a needle 48 slideably mounted in the plunger 31.

Figure 2:
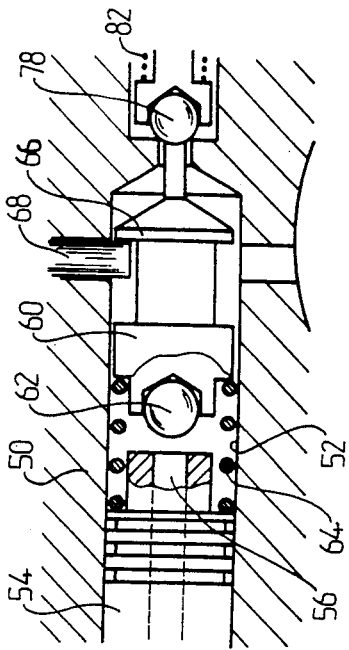
FIG. 2 is a partial enlarged view of the device shown in FIG. 1.

In the bore 12 a sleeve 50 is fixedly mounted which incorporates a bore 52 in which is slideably mounted a control piston 54 (see FIG. 2). The control piston 54 incorporates a longitudinal passage 56 which is in hydraulic communication with the pressure chamber 38 through the intermediary of a transverse hole 58. The device also incorporates a control component 60 which is slideably mounted in the bore 52 and which incorporates a ball 62 capable of closing the passage 56. The ball 62 is held, in the rest position of the device as shown, in its open position by a spring 64 situated between the control piston 54 and a control component 60, the piston 54 and component 60 combining to form second piston means. The control component 60 incorporates a shaped collar 66 which comes to bear, in the rest position of the device, against a hollow pin 68 which connects the bore 52 to the braking circuit 70 of the vehicle through the intermediary of an annular chamber 72 which is defined internally in the bore 12 by the sleeve 50.

The closure component 14 incorporates a bore 74 which is intended to be connected to a source of fluid under pressure 76, in which two opposing ball valves 78, 80 are mounted, held against their respective seats by a spring 82.

A bush 84 is slideably mounted on the sleeve 50, the bush 84 incorporating an annular seal 86 which isolates the pressure chamber 38 from the annular chamber 72. The bush 84 is normally pushed to the left, looking at the drawings, by a spring 88 which bears against a radial shoulder 90 on the sleeve 50. The bush 84 is joined to the first piston 16 through the intermediary of a spring 92, and a second spring 94 joins the plunger 31 to the first piston 16.

When the device is operated the plunger 26 moves to the right (looking at the figures) and comes to bear against the pushrod 20 causing movement of the latter together with, through the intermediary of the spring 42, movement of the plunger component 30. When the plunger component 30 moves it causes, through the intermediary of the needle 48, movement of the control piston 54. During this time, the ball valve 44 remains open owing to the action of the spring 94 which moves the plunger 31 to the right. The movement of the control piston 54 causes the valve 62 to close, isolating the pressure chamber 38 from the annular chamber 72.

If the movement of the plunger 26 continues, the control component 60 moves and opens the ball 78 allowing fluid under pressure to pass through the hollow pin 68 and the chamber 72 towards the brakes 70 of the vehicle. The pressure in the chamber 72 rises linearly with the force transmitted by the spring 42 until the head of the plunger 26 comes into contact with the first piston means 16 and the latter begins to move and compresses the spring 94 whose force becomes added to that of the spring 42 so as to actuate the control piston 54. The combined action of the springs 94 and 42 upon the control piston 54 to control the opening of the ball 78 thus causes a braking pressure to be created in the annular chamber 72 which is proportional to the sum of the forces acting upon the control piston less the force of the spring 82 pushing the ball 78. This results in the provision in the braking circuit 70 of a braking pressure which has a non-linear characteristic relative to the pedal travel.

When braking is released, the force on the plunger 26 relaxes which allows the control piston 54 to return to the left of the control component 60 which comes into abutment against the pin 68 and the ball 78 closes. The function of the profiled collar 66 is to dampen the rise in pressure in the chamber 72 owing to the reduced clearance between the collar and the bore 52. Additional movement of the plunger 26 causes the ball 62 to open allowing the fluid under presusre in the chamber 72 to pass through the passage 56, the hole 58 and the seat 46 towards the reservoir 40. The slight clearance between the plunger component 30 and the inside surface of the sleeve 16 serves to dampen the pressure drop so as to avoid the various hydraulic vibrations.

If during relaxation the force becomes steady, the valve 62 recloses under the action of the various springs and creates a corresponding pressure in the brakes of the vehicle.

In the case of failure of the high pressure circuit 76, the ball valve 80 closes, isolating the chamber 72 from the pressure circuit. When the device is operated the plunger 31 comes into abutment against the sleeve 50, the valve 44 closes, the control piston 54 slides to the right but the ball valve 62 remains open because the stiffness of the spring 64 is greater than that of the spring 82. The chamber 38 becomes the chamber of a hydrostatic master cylinder, movement of the plunger 26 causing the piston 16 to slide, which compresses the fluid in the chamber 38. The fluid under pressure passes from the chamber 38 to the brakes 70 through the hole 58, the passage 56 and the hollow pin 68.

The pressure of the fluid in the chamber 38 is equal to that in the chamber 72 and therefore the annular seal 86 and the bush 84 are free to slide. Thus, when the piston 16 moves to the right, the spring 92 causes the bush 84 to slide without the spring 92 becoming compressed. The braking force at the pedal is thus reduced.

The reduced size of the ball 62 ensures the internal leaks are reduced, such a valve being able to be perfectly sealed owing to its shape, in contrast to the large conical valves from the prior art which are, moreover, difficult to make. In addition, the two concentric pistons 16, 18 and the shape of the seals used in the device ensure that the thresholds of force are reduced.

I claim:

1. A hydraulic assistance device, comprising a casing provided with a first bore in which first piston means is mounted slideably, the first piston means capable of displacement by means of a brake pedal between a first position allowing communication between a first chamber connected to a braking circuit and a low pressure reservoir and which position isolates the first chamber from a high pressure fluid source, and a second position isolating the first chamber from the low pressure reservoir and causing the chamber to communicate with the high pressure fluid source, the device also including a second chamber formed in the casing, means of communication between the first chamber and the reservoir including a second bore in which second piston means is mounted slideably, the second piston means including a bore, the first piston means having a bore in which a plunger is slideably mounted, the plunger joining the first piston means to the second piston means, and valve means for closing the means of communication between the first chamber and the reservoir under the effect of the displacement of the first piston means, characterized in that the first chamber is isolated from the second chamber by a seal which is mounted slideably in the first bore and is capable of being moved by the first piston means when hydraulic pressures in the first and second chambers are essentially equal, the seal biased by spring means connected with the first piston means, and the device including a sleeve which is mounted fixedly in the first bore and which forms with the first bore the first chamber, the seal mounted slideably about the sleeve.

2. The device according to claim 1, characterized in that the first piston means includes a sleeve in which an inner piston and a plunger component are mounted slideably, the plunger capable of being actuated by the plunger component which is joined to the inner piston by a spring.

3. The device according to claim 2, characterized in that the second piston means includes a control piston and a control component.

4. The device according to claim 2, characterized in that the fixedly mounted sleeve includes a bush mounted slideably thereon, the seal disposed on the bush.

* * * * *